United States Patent Office 3,629,284
Patented Dec. 21, 1971

3,629,284
PROCESS FOR THE PREPARATION OF 3-INDOLYL ALIPHATIC ACID DERIVATIVES
Hisao Yamamoto, Nishinomiya-shi, and Masaru Nakao, Osaka, Japan, assignors to Sumitomo Chemical Company, Ltd., Osaka, Japan
No Drawing. Continuation of application Ser. No. 541,967, Apr. 12, 1966. This application June 23, 1969, Ser. No. 838,037
Claims priority, application Japan, Apr. 19, 1965, 40/23,078; Apr. 26, 1965, 40/24,928, 40/24,929, 40/24,930; Nov. 30, 1965, 40/73,856, 40/73,857; Dec. 7, 1965, 40/75,430; Dec. 8, 1965, 40/75,792, 40/75,793; Dec. 29, 1965, 41/81,794, 41/81,795, 41/81,796; Jan. 20, 1966, 41/3,187; Jan. 31, 1966, 41/5,754; Feb. 7, 1966, 41/7,276, 41/7,277
Int. Cl. C07d 27/56
U.S. Cl. 260—326.13
25 Claims

ABSTRACT OF THE DISCLOSURE

N-acyl 3-indolylaliphatic acid compounds are prepared by (1) reacting a phenylhydrazone compound with an acylating agent to give $N^1$-acylated phenylhydrazone compound, (2) decomposing the resultant compound with a mineral acid to yield an $N^1$-acylated phenylhydrazine, (3) and then reacting the resultant product with an aliphatic acid compound. The final products have the formula

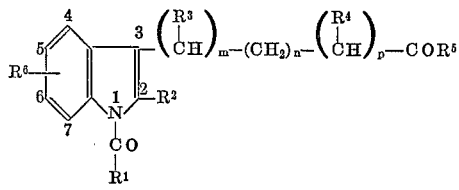

wherein $R^1$ is an unsubstituted or $C_1$–$C_3$ alkyl-, $C_1$–$C_3$ alkoxy-, $C_1$–$C_3$ alkylthio- or halogen-substituted phenyl or naphthyl group, or an unsubstituted or halogen- or $C_1$–$C_2$ alkyl-substituted, pyridine, thiophene, furan or piperidine ring, $R^2$ and $R^3$ are hydrogen atoms or $C_1$–$C_2$ alkyl groups, $R^4$ is a hydrogen atom or a carboxy or $C_1$–$C_4$ alkoxycarbonyl group, $R^5$ is an alkoxy having 4 or less carbon atoms, benzyloxy, amino or hydroxy group, $R^6$ is a $C_1$–$C_3$ alkoxy, or $C_1$–$C_3$ alkylthio or nitro group or a halogen atom at the position of 4, 5 or 6, $m$ and $p$ are 0 or 1 and $n$ is 0 or an integer of from 1 to 3, and are produced in good yields. Typical examples include N-nicotinoyl-2-methyl-5-methoxy-3-indolylacetic acid, γ-[1-Cp - chlorobenzoyl) - 2,5-dimethyl-3-indolyl]-butyric acid and N-(p-methylbenzoyl)-2-methyl-5-methoxy-3-indolylacetic acid, all of which exhibit excellent anti-inflammatory properties with low toxicity on the basis of standard laboratory animal tests.

This application is a continuation of copending application Ser. No. 541,976, filed Apr. 12, 1966, and now abandoned.

The present invention relates to a novel process for producing N-substituted indole derivatives having high anti-inflammatory, anti-pyretic and analgesic activities. More particularly the present invention relates to a novel process for producing N-acyl 3-indolyl-aliphatic acid compounds comprising reacting an $N^1$-acylated phenylhydrazine compounds with an aliphatic acid compound.

According to the conventional method for producing an N-acylated indole compounds, an indole ring is synthesized at first and then acylated, in which the metal salts of indole made of NaH, NaHN$_2$ and KNH$_2$ are reacted with a halogenated acyl in most cases as shown in the following:

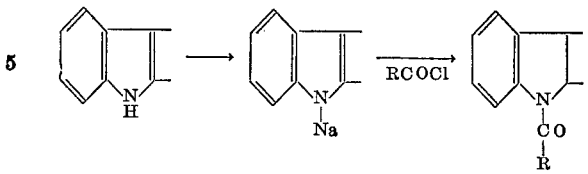

The said method is very complicated, of which the yield is usually very poor.

Further, when it is employed, on synthesizing a 3-free aliphatic acid substituted indole compound its carboxylic acid group should be covered by esterification. But if they are made into a usual ester of methyl or ethyl, when the ester is hydrolyzed after the acylation, the amide bond is simultaneously broken as shown in the following.

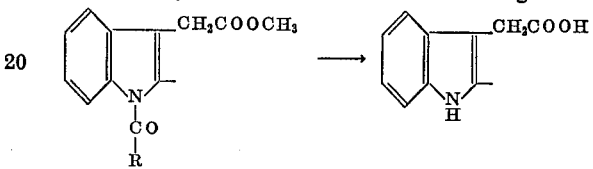

Therefore, a special ester must be formed, for example, tertiary butyl ester. This esterification is very difficult. As it is shown below, for example, it is made into an indolyl aliphatic acid anhydride and the resultant anhydride is added to tertiary butyl alcohol to synthesize indolyl adiphatic acid butyl ester. Further the hydrolysis of it after acylation is a reaction in which very strict conditions are demanded and moreover the yield of each process of it is very poor.

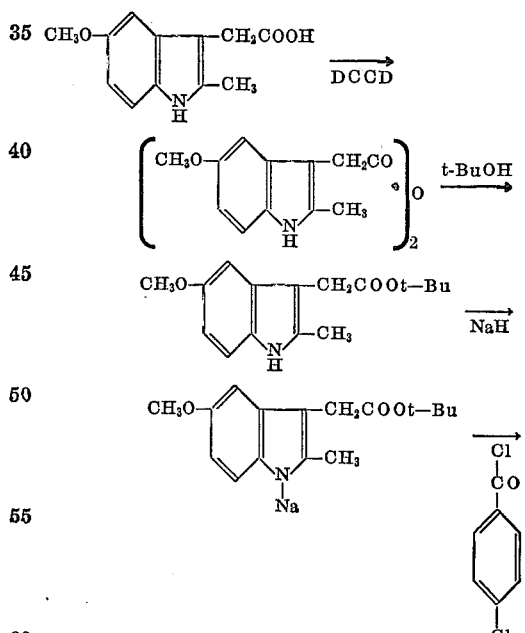

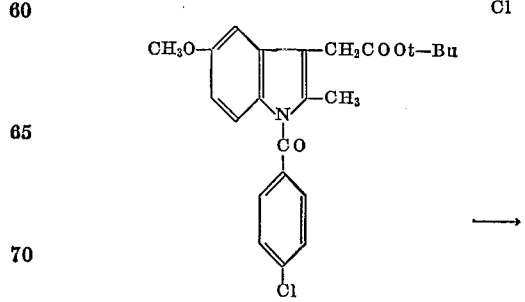

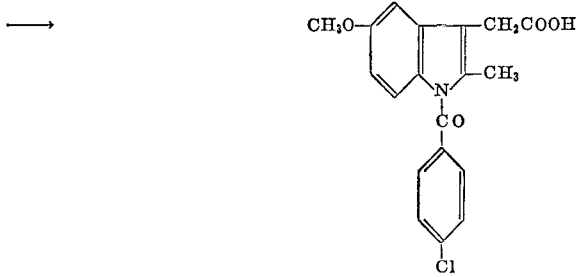

One object of the present invention is to provide a novel process for producing 1-acyl-3-indolyl-aliphatic acid compounds advantageously on a commercial scale. Another object of the present invention is to provide a process for manufacturing such compounds economically in a high yield. Other object of the present invention is to provide these novel compounds and their novel intermediates. Further objects of the present invention is to provide novel pharmaceutical compositions containing these compounds as the effective ingredients. Still further objects will be apparent from the following description.

In order to accomplish these objects the present invention provides a novel process for producing 3-indolyl-aliphatic acid compounds of the formula,

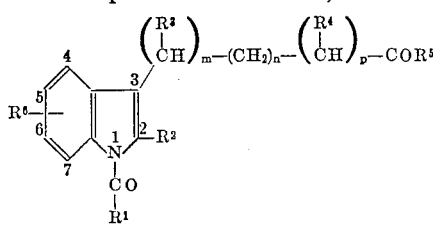

wherein $R^1$ is an unsubstituted or lower alkyl-, alkoxy-, alkylthio- or halogen-substituted aromatic ring, or an unsubstituted or halogen- or alkyl-substituted, nitrogen-, oxygen- or sulphur-atom-containing-five-membered- or six-membered heterocyclic ring, $R^2$ and $R^3$ are hydrogen atoms or lower alkyl groups, $R^4$ is a hydrogen atom or a carboxy or alkoxycarbonyl group, $R^5$ is an alkoxy having 4 or less carbon atoms, benzyloxy, amino or hydroxy group, $R^6$ is a lower alkyl, alkoxy, alkylthio or nitro group or a halogen atom at the position of 4, 5 or 6, $m$ and $p$ are 0 or 1 and $n$ is 0 or an integer of from 1 to 3, which comprises reacting an $N^1$-acylated phenylhydrazine compound of the formula,

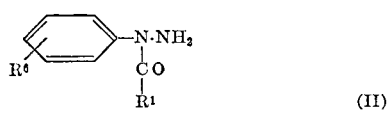

wherein $R^1$ and $R^6$ have the same meanings as above defined and $R^6$ is at meta or para position of hydrazine group in this case, with an aliphatic acid compound of the formula,

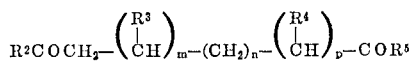

wherein $R^2$, $R^3$, $R^4$, $R^5$, $m$, $n$ and $p$ have the same meanings as identified above.

Further the present invention provides a process for producing 3 - indolyl aliphatic acid compounds of the formula,

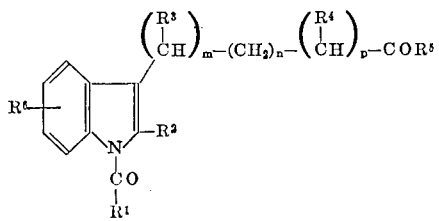

wherein $R^1$, $R^2$, $R^3$, $R^4$, $R^5$, $R^6$, $m$, $n$ and $p$ have the same meanings as identified above, which comprises decomposing an $N^1$-acylated phenylhydrazone compound of the formula,

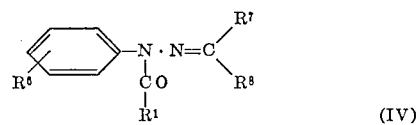

wherein $R^1$ and $R^6$ have the same meanings as identified above and $R^7$ and $R^8$ are hydrogen atoms or unsubstituted alkyl groups or alkyl groups having one or more halogen, hydroxy, alkoxy or alkoxycarbonyl or phenyl groups, with a decomposing agent to yield an $N^1$-acylated phenylhydrazine compound of the formula,

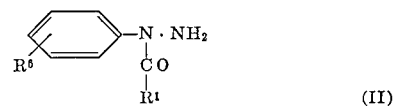

wherein $R^1$ and $R^6$ have the same meanings as identified above, and reacting the resultant $N^1$-acylated phenylhydrazine compound with an aliphatic acid compound of the formula,

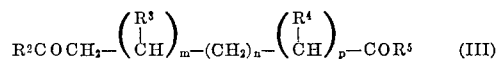

wherein $R^2$, $R^3$, $R^4$, $R^5$, $m$, $n$ and $p$ have the same meanings as identified above to yield the 3-indolyl aliphatic acid compound.

Still further the present invention provides a process for producing 3-indolyl aliphatic compounds of the formula,

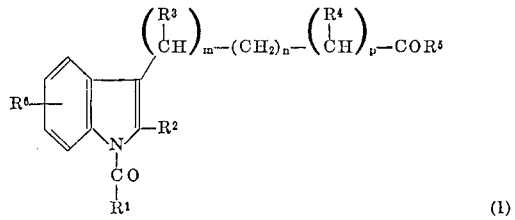

wherein $R^1$, $R^2$, $R^3$, $R^4$, $R^5$, $R^6$, $m$, $n$, and $p$ have the same meanings as identified above, which comprises reacting a phenylhydrazone compound of the formula,

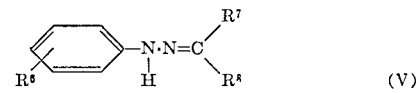

wherein $R^6$, $R^7$ and $R^8$ have the same meanings as identified above, with a compound having the formula,

wherein $R^1$ has the same meanings as identified above and Y represents a halogen or an ester residue, to yield an $N^1$-acylated phenylhydrazone compound of the formula,

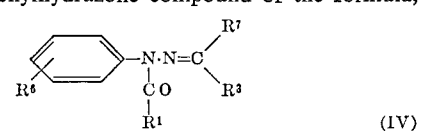

wherein $R^1$, $R^6$, $R^7$ and $R^8$ have the same meanings as identified above, decomposing the resultant $N^1$-acylated phenylhydrazone compound with a decomposing agent to yield an $N^1$-acylated phenylhydrazine compound of the formula,

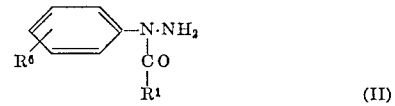

wherein $R^1$ and $R^6$ have the same meanings as identified above, and reacting the resultant $N^1$-acylated phenylhydrazine compound with an aliphatic acid compound of the formula,

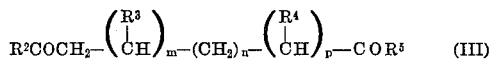

wherein $R^2$, $R^3$, $R^4$, $R^5$, $m$, $n$, and $p$ have the same meanings as identified above to yield the 3-indolyl aliphatic acid compound.

The process of the present invention may be shown according to the following equations:

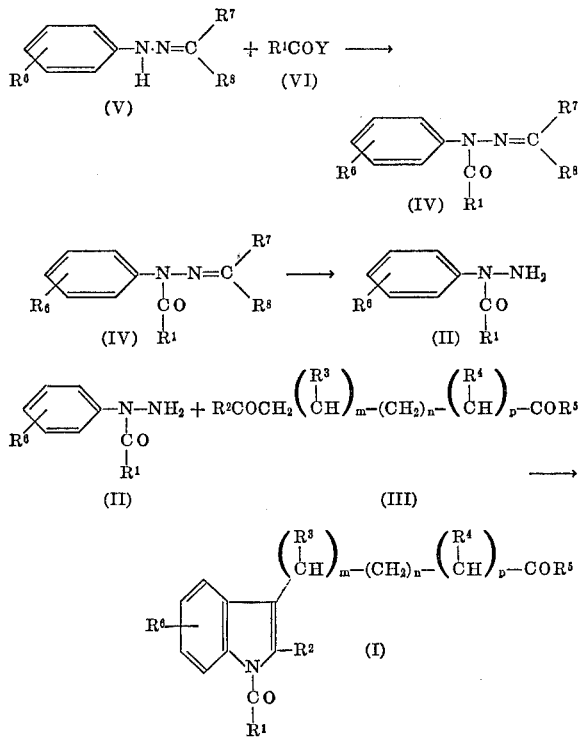

In the above formulas, $R^1$, $R^2$, $R^3$, $R^4$, $R^5$, $R^6$, $R^7$, $R^8$, $m$, $n$ and $p$ have the same meanings as identified above.

In the process of the present invention, $N^1$-acylated phenylhydrazine compound (II) and $N^1$-acylated phenylhydrazone compound (IV) as the intermediates may be synthesized by other processes than disclosed herein. These intermediates, (II) and (IV), are novel compounds.

Next the process of the present invention is explained in due order as follows.

Firstly a process of the reaction of a phenylhydrazone compound (V) and a compound (VI) will be described. In this reaction, if the compound (VI) react without covering its $N^2$ with ketones or aldehydes, like the compound expressed in the formula of (V), the aimed product can scarcely be obtained. But the following occurs,

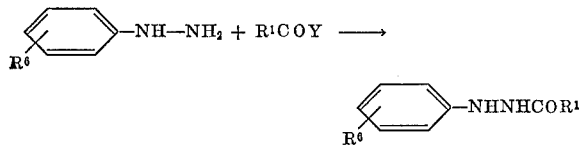

wherein $R^1$, $R^2$ and Y have the same meanings are identified above, that is, only asymmetric hydrazine derivative is obtained.

This reaction is carried out in the presence of a hydrogen halide acceptor. As the hydrogen halide acceptor, a tertiary amine, for example, pyridine or dimethylaniline, is used in many cases. These hydrogen halide acceptors themselves can be used as solvents but such inert solvents as ether, benzene, toluene, tetrahydrofuran, etc. can be used, too. Anyway, an equimolar or more amount of these hydrogen halide acceptors is required in comparison with the amount of hydrogen halide which is produced. As the halogen in the formula of the compound (VI), chlorine, bromine, iodine or fluorine is used, and chlorine is preferable from commercial point of view. The reaction temperature may be room temperature in many cases but the reaction proceeds even below 0° C., depending on the kind of a solvent used. The reaction is exothermic, finishing in a moment or several hours. After the reaction finishes, the separated hydrogen halide salt of the hydrogen halide acceptor is filtered off and if the filtrate is concentrated under a reduced pressure or the reaction mixture is poured into water when a water-soluble solvent like pyridine is used as the solvent, the aimed $N^1$-acylated phenylhydrazine compound is easily obtained as crystals or an oily matter. This may be purified with an appropriate solution, e.g. alcohol-water.

In some cases of this reaction, a phenylhydrazone compound represented by the Formula V reacts with a compound represented by the Formula VI to yield directly an $N^1$-acylated phenylhydrazine compound represented by the Formula II in place of an $N^1$-acylated phenylhydrazone compound represented by the Formula IV, if the treatment is carried out in the case of a comparatively weak $-N=C<$ bonding or under too severe condition of reaction.

According to the method of the present invention, the following compounds can be obtained in a high yield. As the $N^1$-acylated phenylhydrazone compounds (IV), there are illustrated:

Acetaldehyde $N^1$-(p-chlorophenyl)-$N^1$-
(p-chlorobenzoyl)hydrazone
Acetaldehyde $N^1$-(p-methylphenyl)-$N^1$-
(p-chlorobenzoyl)hydrazone
Benzaldehyde $N^1$(p-methylphenyl)-$N^1$-
(p-chlorobenzoyl)hydrazone
Acetaldehyde $N^1$-p-methoxyphenyl-$N^1$-
(p-methoxybenzoyl)hydrazone
Acetaldehyde $N^1$-(p-methoxyphenyl)-$N^1$-
(beta-naphtholyl)hydrazone
Acetaldehyde $N^1$-(p-methoxyphenyl)-$N^1$-
(p-chlorobenzoyl)hydrazone
Acetaldehyde $N^1$-(p-ethoxyphenyl)-$N^1$-
(m-chlorobenzoyl)hydrazone
Acetaldehyde $N^1$-(p-hydroxyphenyl)-$N^1$-
benzoylhydrazone
Acetaldehyde $N^1$-(5-chloro-2-thenoyl)-$N^1$-
(p-chlorophenyl)hydrazone
Acetaldehyde $N^1$-(5-thiazoyl)-$N^1$-
(p-chlorophenyl)hydrazone
Acetaldehyde $N^1$-(5-thiazoyl)-$N^1$-
(p-methylthiophenyl)hydrazone
Acetaldehyde $N^1$-(p-chlorobenzoyl)-$N^1$-
(m-methylphenyl)hydrazone
Benzaldehyde $N^1$-(2-thenoyl)-$N^1$-
(p-methoxyphenyl)hydrazone
Chloral $N^1$-(N-methylhexahydronicotinoyl)-$N^1$-
(p-methoxyphenyl)hydrazone
Acetol $N^1$-(2-furoyl)-$N^1$-(p-methoxyphenyl)hydrazone When hydrazone compounds represented by the Formula V are the hydrazone compounds of ethyl levulinate, ethyl acetoacetate, methyl 4-methoxy-3-oxo-n-butyrate, etc., the following $N^1$-acylated hydrazine compounds can be directly obtained very easily, depending on the condition of reaction.

$N^1$-(p-methoxyphenyl)-$N^1$-(p-chlorobenzoyl)hydrazine
$N^1$-(p-ethoxyphenyl)-$N^1$-(m-chlorobenzoyl)hydrazine
$N^1$-(m-methylphenyl)-$N^1$-(p-chlorobenzoyl)hydrazine
$N^1$-(p-hydroxyphenyl)-$N^1$-(o-chlorobenzoyl)hydrazine
$N^1$-(p-ethoxyphenyl)-$N^1$-benzoylhydrazine
$N^1$-(p-methylthiophenyl)-$N^1$-(p-methylthiobenzoyl)hydrazine
$N^1$-(p-methylphenyl)-$N^1$-(p-chlorobenzoyl)hydrazine
$N^1$-(5-chloro-2-thenoyl)-$N^1$-(p-chlorophenyl)hydrazine
$N^1$-(5-thiazoyl)-$N^1$-(p-chlorophenyl)hydrazine N$^1$-(5-thiazoyl)-N$^1$-(p-methylthiophenyl)hydrazine
N$^1$-(2-thenoyl)-N$^1$-(p-methoxyphenyl)hydrazine
N$^1$-(N-methylhexahydronicotinoyl)-N$^1$-(p-methoxyphenyl)hydrazine
N$^1$-isonicotinoyl-N$^1$-(p-methoxyphenyl)hydrazine
N$^1$-(2-thenoyl)-N$^1$-(p-tolyl)hydrazine
N$^1$-(2-furoyl)-N$^1$-(p-methoxyphenyl)hydrazine Those novel N$^1$-acylated phenylhydrazone compounds and N$^1$-acylated phenylhydrazine compounds which are obtained by the method of the present invention have psychic stimulant, anti-tumor, bactericidal, and fungicidal actions and they are very important compounds as intermediates for producing remarkable effective anti-inflammatory drugs, analgesics and anti-pyretics.

Next, the process for producing an N$^1$-acylated phenylhydrazine compound (II) by decomposing an N$^1$-acylated phenylhydrazone compound (IV) will be described.

An N$^1$-acylated phenylhydrazone compound (IV) is dissolved in an adequate solvent, for example, alcohol, ether, benzene or toluene. Then, more than equimolar dry hydrogen chloride gas is absorbed to the resultant solution. When alcohol is used, absolute alcohol achieves the good yield. Then the HCl salt of the N$^1$-acylated phenylhydrazine compound (II) precipitates as crystals in good yield. H$_2$SO$_4$ or others can be used in place of HCl gas. When ether, benzene or toluene is used as the solvent, a small amount of alcohol should be contained in it. The reaction temperature is preferably 0-25° C. but can be below 0° C.

As the N$^1$-acylated phenylhydrazone compound (IV), various compounds can be illustrated. For example, the hydrazones of acetylaldehyde, chloral, benzaldehyde, acetol, ethyl acetoacetate and methoxy acetone can be easily decomposed in general cases to produce the aimed N$^1$-acylated phenylhydrazine compounds (II). Among them, the hydrazone of acetaldehyde especially has distinctive commercial advantage.

According to the present invention, the following compounds, for example, can be obtained as the N$^1$-acylated phenylhydrazine compounds (II).

N$^1$-nicotinoyl-N$^1$-(p-methoxyphenyl)hydrazine
N$^1$-isonicotinoyl-N$^1$-(p-chlorophenyl)hydrazine
N$^1$-isonicotinoyl-N$^1$-(p-methylthiophenyl)hydrazine
N$^1$-(2-thenoyl)-N$^1$-(p-methoxyphenyl)hydrazine
N$^1$-(5-chloro-2-thenoyl)-N$^1$-(p-methoxyphenyl)hydrazine
N$^1$-(2-furoyl)-N$^1$-(p-methoxyphenyl)hydrazine
N$^1$-(N-methyl-hexahydronicotinoyl)-N$^1$-(p-ethoxyphenyl)hydrazine
N$^1$-(5-thiazoyl)-N$^1$-(p-chlorophenyl)hydrazine
N$^1$-(p-ethoxyphenyl)-N$^1$-(methylthiobenzoyl)hydrazine
N$^1$-(p-methylthiophenyl)-N$^1$-($\beta$-naphthoyl)hydrazine
N$^1$-(p-methoxyphenyl)-N$^1$-(m-methylbenzoyl)hydrazine
N$^1$-(p-methoxyphenyl)-N$^1$-(p-chlorobenzoyl)hydrazine
N$^1$-(m-methylphenyl)-N$^1$-(p-chlorobenzoyl)hydrazine
N$^1$-(p-methoxyphenyl)-N$^1$-(p-chlorobenzoyl)hydrazine
N$^1$-(p-methoxyphenyl)-N$^1$-benzoylhydrazine
N$^1$-(p-ethoxyphenyl)-N$^1$-(m-chlorobenzoyl)hydrazine And their salts, for example, their hydrochlorides, sulphates and phosphates can be easily obtained. They are all the novel compounds that have not been reported in any literature.

Those compounds have psychic stimulant, anti-tumor bactericidal and fungicidal activities, so they are very useful and further very important as intermediates for producing strong anti-inflammatory drugs, analgesics and anti-pyretics.

Lastly the process for producing a 3-indolyl aliphatic acid compound (I) by the reaction of an N$^1$-acylated phenylhydrazine compound (II) with an aliphatic acid compound (III), which is the most important process of the present invention, will be described.

This reaction is carried out on heating in the presence of an adequate condensing agent or not in an organic solvent or not. The yield is very high.

The present reaction proceeds smoothly without a solvent but it is preferable to use a suitable solvent in many cases. As the solvent, for example, such organic acids as acetic acid, formic acid, propionic acid, lactic acid and butyric acid or such non-polar organic solvents as cyclohexane, n-hexane, benzene, toluene, etc. and other organic solvents, such as dioxane and dimethyl formamide are used, on condensing free aliphatic acid derivatives. On condensing aliphatic acid ester, besides those solvents, an corresponding alcohol can be used. Further when an alcohol is used as a solvent on condensing a free aliphatic acid derivative, an indole aliphatic acid ester is obtained. That is, in the Formula I, R$^5$ becomes an alkoxy group. For example,

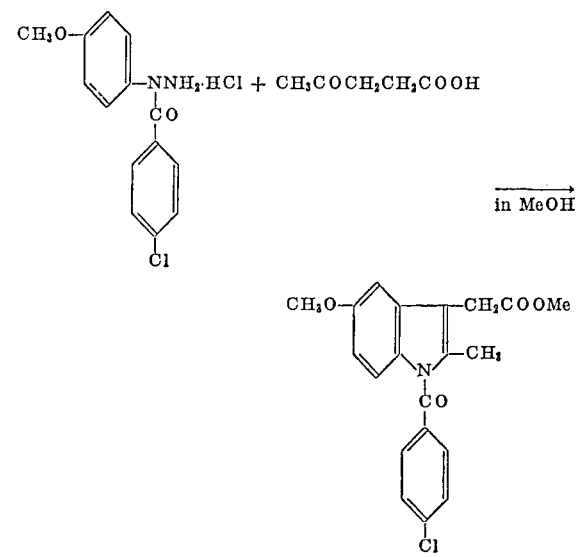

Within a range of temperatures from 50° to 200° C., the reaction generally proceeds but temperatures ranging from 65° to 95° C. is preferable. The reaction proceeds rapidly and is generally finished in a short period of time, mostly in one or two hours. The condensing agent is not needed in some cases but desirable results are achieved generally by using condensing agent. The condensing agent is inorganic acids such as hydrochloric acid, sulfuric acid and phosphoric acid, metal halides such as zinc chloride and copper chloride, heavy metal power such as copper powder, Grignard's reagents, boron fluorides, polyphosphoric acid or ion-exchange resins. Hydrochloric acid or the like is required in an equimolar or more amount, while copper powder or the like may well be in a small amount.

The treatment after the reaction varies more or less with the kind of the solvent in use, but in most cases, the reaction mixture, is allowed to stand at room temperature or in a refrigerator (about 5° C.), and then the crystals of the aimed product generally precipitates in a large amount.

When the crystals do not produce, reaction mixture is concentrated under reduced pressure, or water, acetic acid-water or petroleum ether is adequately added to the mixture. As a result, the beautiful crystals can be obtained. As solvents for recrystallizing the present compound, ether, acetone, acetone-water, alcohol, alcohol-water, benzene and acetic acid are generally preferred. Further the crystals of the present compound generally show polymorphism and its crystal form varies with the kind of the recrystallizing solvent and the crystallizing velocity The precipitated crystals are separated by filtration and they are generally washed with an aqueous solution of acetic acid, alcohol-water, water or petroleum ether before they are dried. The objective products are generally crystalline but when it is an ester, it is oily in some cases.

The reaction solvents, reaction conditions, condensing agents and recrystallization solvents which have mentioned above are only presented as illustrative of the present invention but not in its limitation, needless to speak of.

The following compounds are obtained easily in good yield, theoretically or in nearly theoretical yield in most cases, according to the process of the present invention.

N-(2′-thiazoyl)-2-methyl-5-methoxy-3-
  indolylacetic acid
N-(2′-pyrimidylcarbonyl)-2-methyl-5-ethoxy-3-
  indolylacetic acid
N-(p-chlorobenzoyl)-2-methyl-4-methoxy- and 6-
  methoxy-3-indolylacetic acid
N-nicotinoyl-2-methyl-5-methoxy-3-
  indolylacetic acid
N-(2′-thenoyl)-2-methyl-5-methoxy-3-
  indolylacetic acid
N-(2′-furoyl)-2,5-dimethyl-3-indolylacetic acid
γ-{N-(2′-thenoyl)-2-methyl-5-methoxy-3-
  indolyl}butyric acid
N-isonicotinoyl-2-methyl-5-methoxy-3-
  indolylacetic acid
β-{N-(2′-furoyl)-2,5-dimethyl-3-indolyl}propionic acid
γ-{N-(2′-thenoyl)-2-methyl-5-methoxy-3-
  indolyl}butyric acid
N-(p-chlorobenzoyl)-2,4-dimethyl- and 2,6-dimethyl-
  3-indolylacetic acid
Methyl N-isonicotinoyl-2-methyl-5-methoxy-3-
  indolylacetate
Methyl N-(5′-chloro-2′-thenoyl)-2-methyl-5-methyl-
  thio-3-indolylacetate
Dimethyl N-(2′-furoyl)-5-chloro-3-indolylmalonate
Methyl N-nicotinoyl-2-methyl-5-methoxy-3-
  indolylacetic
N-(p-chlorobenzoyl)-2-methyl-5-methoxy-3-
  indolylacetic acid
γ-{N-(p-chlorobenzoyl)-2-methyl-5-methoxy-3-
  indolyl}-butyric acid
N-(p-chlorobenzoyl)-2-methyl-5-chloro-3-
  indolylacetic acid
N-(p-chlorobenzoyl)-2,5-dimethyl-3-
  indolylacetic acid
N-(p-chlorobenzoyl)-2-methyl-5-fluoro-3-
  indolylacetic acid
N-benzoyl-2,5-dimethyl-3-indolylacetic acid
N-(p-methylbenzoyl)-2-methyl-5-methoxy-3-
  indolylacetic acid
N-(p-methoxybenzoyl)-2-methyl-5-methoxy-3-
  indolylacetic acid
α-{N-(p-chlorobenzoyl)-2-methyl-5-methoxy-3-
  indolyl}-propionic acid
N-benzoyl-2-methyl-5-chloro-3-indolylacetic acid
N-benzoyl-2-methyl-5-methoxy-3-indolylacetic acid
N-(p-trifluoromethylbenzoyl)-2-methyl-5-methoxy-3-
  indolylacetic acid
N-(2′-furoyl)2,4-dimethyl-and-2,6-dimethyl-3-
  indolylacetic acid
β-{N-(2′-pyrimidylcarbonyl)-2-methyl-5-ethoxy-3-
  indolyl}-propionic acid
α-{N-(2′-pyrazoyl)-2-ethyl-5-chloro-3-indolyl}pro-
  pionic acid
Ethyl N-(N′-methylhexahydronicotinoyl)-5-methoxy-
  3-indolylacetate
t-Butyl N-(N′-methylhexahydronicotinoyl)-5-methoxy-
  3-indolylacetate
Benzyl N-(N′-methylhexahydronicotinoyl)-2-methyl-
  5-methoxy-3-indolylacetate Di-methyl N-(N′-methylhexahydronicotinoyl)-2-
  methyl-5-bromo-3-indolylmalonate
Sodium N-(2′-thenoyl)-2-methyly-5-methoxy-3-
  indolylacetate
Sodium N-(p-chlorobenzoyl)-2-methyl-5-methoxy-
  3-indolylacetate
N-(p-chlorobenzoyl)-5-nitro-3-indolylacetic acid Many other 3-indolyl aliphatic acid derivatives can be thus synthesized.

In the method of the present invention, when the aliphatic acid compound (III) of which R⁴ is carboxy group in the formula reacts with an N¹-acylated phenylhydrazine compound (II), the resulting 3-indolyl aliphatic acid compound (I) is decarbonated in some cases so that R⁴ becomes H in its formula.

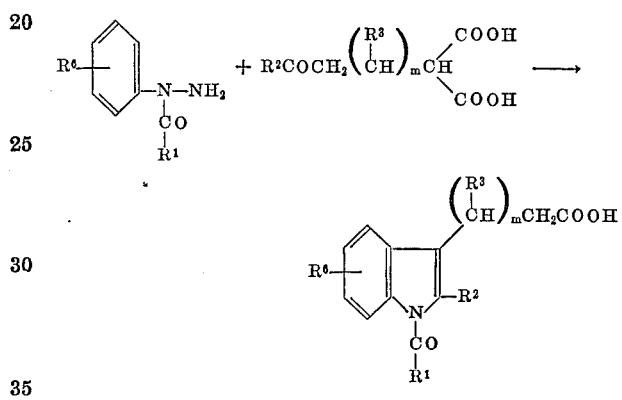

wherein $R^1$, $R^2$, $R^3$, $R^6$ and $m$ have the same meanings as mentioned above.

The following compounds, for example, are obtained easily in good yield by this method.

N-(p-chlorobenzoyl)-2-methyl-5-methoxy-3-
  indolylacetic acid
N-(p-chlorobenzoyl)-2-methyl-5-chloro-
  indolylacetic acid
N-(p-chlorobenzoyl)-2,5-dimethyl-3-
  indolylacetic acid
N-benzoyl-2-methyl-5-chloro-3-
  indolylacetic acid
N-(p-methylbenzoyl)-2-methyl-5-methoxy-3-
  indolylacetic acid
N-(p-methoxybenzoyl)-2-methyl-5-methoxy-3-
  indolylacetic acid
N-(p-chlorobenzoyl)-2 -methyl-5-methoxy-3-
  indolylacetic acid
α-{N-(p-methylthiobenzoyl)-2-methyl-5-methoxy-
  3-indolyl}-propionic acid
N-nicotinoyl-2-methyl-5-methoxy-3-
  indolylacetic acid
γ-{N-(2′-thenoyl)-2-methyl-5-methoxy-3-
  indolyl}butyric acid
N-(2′-furoyl)-2,5-dimethyl-3-indolylacetic acid
β-{N-(2′-furoyl)-2,5-dimethyl-3-indolyl}pro-
  pionic acid Further, in the process of the present invention, 3-indolyl aliphatic acid compound (I) can be obtained directly from an N¹-acylated hydrazone compound (IV) in some cases, in which 3-indolyl aliphatic acid compound (I) is produced by reacting an N¹-acylated hydrazone compound (IV) with an aliphatic acid compound (III) on heating in the presence of a suitable condensing agent or not in an organic solvent or not.

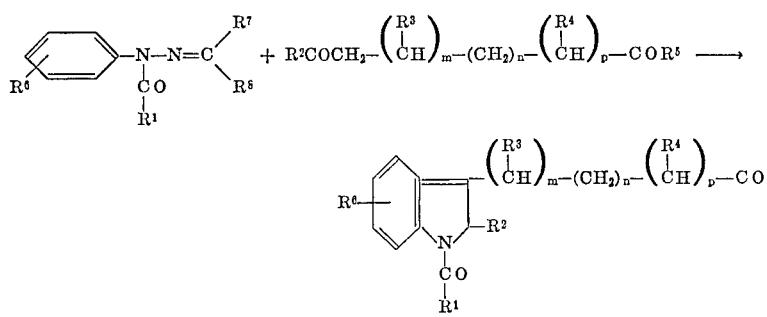

wherein $R^1$, $R^2$, $R^3$, $R^4$, $R^5$, $R^6$, $R^7$, $R^8$, $m$, $n$ and $p$ have the same meanings as mentioned above.

The following compounds, for example, are obtained by this method.

N-(p-chlorobenzoyl)-2-methyl-5-methoxy-3-indolylacetic acid
N-nicotinoyl-2-methyl-5-methoxy-3-indolylacetic acid In this case when $R^4$ is carboxy group in the Formula III, the resulting 3-indolylaliphatic acid compound (I) is decarbonated in some cases, as shown below.

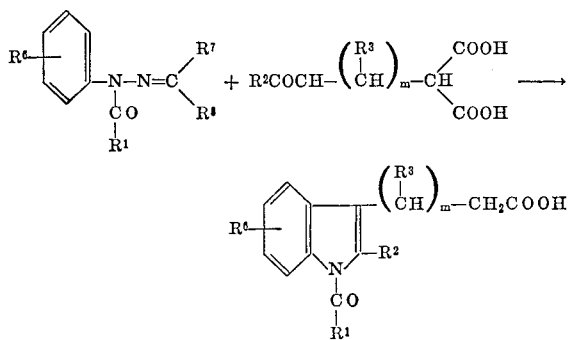

The following compounds, for example, are obtained by this method.

N-(p-chlorobenzoyl)-2-methyl-5-methoxy-3-indolyl-acetic acid
N-(p-chlorobenzoyl)-2,5-dimethyl-3-indolylacetic acid With regard to synthesis of N-acylated indole compounds, process of the present invention is novel and has not been described in any literatures such as "Heterocyclic Compounds" by Elderfield, vol. 3 (1952), chapter 1, pp. 1–274, "Chemistry of Heterocyclic Compounds: With Indole and Carbazole Systems" by W. C. Sumptor and F. M. Miller, (1954) pp. 1–69, Chemical Abstracts, vol. 1 (1907)–vol. 63 (1965) and other various chemical journals.

The present method, by which N-acyl indolylaliphatic acids can be synthesized in a good yield, is very advantageous for this production on a laboratory or commercial scale, and does not need such complicated procedure as required by the conventional methods.

Among novel 3-indolyl aliphatic acid derivatives of the present invention, there are not a few useful compounds, which indicate excellent anti-inflammatory action but possess extremely low toxicity. For example, as we can see from pharmacological experimental results, compounds such as N-nicotinoyl-2-methyl-5-methoxy-3-indolyl acetic acid and N-isonicotinoyl-2-methyl-5-methoxy-3-indolyl acetic acid show low toxicity in spite of their potential anti-inflammatory action and hence their therapeutic ratio is exceedingly great in comparison with other first class anti-inflammatory drugs.

| Compound | Action | | Therapeutic ratio, $LD_{50}/ED_{50}$ |
|---|---|---|---|
| | $ED^1$ (mg./kg.) | $LD_{50}$ (mg./kg.) | |
| N-(p-chlorobenzoyl)-2-methyl-5-methoxy-3-indolylacetic acid (Indomethacin) | 9.2 | <60 | <6.5 |
| Butazolidin | 145 | 680 | 4.7 |
| N-nicotinoyl-2-methyl-5-methoxy-3-indolylacetic acid | 80 | >1,500 | >18.8 |
| N-isonicotinoyl-2-methyl-5-methoxy-3-indolylacetic acid | 105 | >1,500 | >14.3 |

[1] 50% inhibitory oral dose of edema induced in the rats' hind paw after injection of carrageenin.
[2] 50% lethal dose for one week after oral administration to mice.

Indomethacin is most effective in non-steroidal anti-inflammatory drugs, which have been developed until now, but its effectiveness involves the high toxicity. The present inventors also observed the appearance of notable occult blood in the excrete of rats by oral administration of 100 mg./kg. of indomethacin. Even by oral administration of less than 15 mg./kg. an occult blood was observed. Furthermore its delayed toxicity appeared very often and notable bleeding in a intestine of every mouse died was observed.

Further, Butazolidin is a representative anti-inflammatory drug and one of the best drugs which are most widely used now, but its effect is rather low in spite of high acute toxicity.

On the other hand, novel N-nicotinoyl-2-methyl-5-methoxy-3-indolylacetic acid and N-isonicotinoyl-2-methyl-5-methoxy-3-indolylacetic acid did not develop toxic symptoms in rats even after oral administration of more than 1000 mg./kg. dose and its toxicity was minimum low. In these cases, occult blood test in their excrete showed negative. But, the effects of these products are considerably higher than those butazolidin, oxyphenbutazone and the like and therapeutic ratios of these novel products are far greater than those of such first class non-steroidal anti-inflammatory drugs as those medicines mentioned. Therefore, it goes without saying that these novel products are of extremely great value in practical field.

Further N-(p-methylbenzoyl)-2-methyl-5-methoxy-3-indolylacetic acid, γ-{N-(p-chlorobenzoyl)-2,5-dimethyl-3-indolyl}butyric acid and the like also show strong anti-inflammatory action in spite of their lower toxicity, just like the novel products mentioned above.

But, generally speaking, ester compounds, for example, methyl N-isonicotinoyl-2-methyl-5-methoxy-3-indolylacetate and methyl N-isonicotinoyl-2-methyl-5-methoxy-3-indolylacetate showed rather low potency of anti-inflammatory action.

For a clearer understanding of the invention, the following specific examples are given. These examples are intended to be merely illustrative of the invention and not in limitation thereof.

EXAMPLE 1

12.0 g. of acetaldehyde $N^1$-(p-methoxyphenyl)hydrazone having the formula, $$CH_3O-\langle\text{ }\rangle-NH-N=C\langle^{CH_3}_{H}$$

was dissolved in 30 ml. of pyridine, 15 g. of p-chlorobenzoyl chloride was dropped into the resultant solution under cooling with ice. After the reaction mixture was allowed to stand at room temperature for one overnight, it was poured into cold water. As a result, 19 g. of crude crystals of acetaldehyde $N^1$-(p-methoxyphenyl)-$N^1$-(p-chlorobenzoyl)hydrazone having the formula, $$CH_3O-\langle\text{ }\rangle-\underset{\underset{\underset{\langle\text{ }\rangle}{\underset{Cl}{|}}}{\overset{|}{C=O}}}{N}-N=C\langle^{CH_3}_{H}$$

was obtained.

They were recrystallized from alcohol-water to obtain the pure product, M.P. 107°–108° C.

*Microanalysis.*—Calculated (percent): C, 63.47; H, 4.96; N, 9.26; Cl, 11.74. Found (percent): C, 63.06; H, 4.83; N, 9.21; Cl, 11.69.

In case of using benzaldehyde or chloral hydrazone in place of acetaldehyde hydrazone, corresponding $N^1$-(p-methoxyphenyl)-$N^1$-(p-chlorobenzoyl)hydrazone was obtained.

In similar way as in Example 1, the following hydrazones were obtained.

EXAMPLE 2

Acetaldehyde $N^1$-(p-methylphenyl)-$N^1$-(p-chlorobenzoyl)hydrazone—M.P. 124°–125° C.

EXAMPLE 3

Acetaldehyde $N^1$-nicotinoyl-$N^1$-(p-methoxyphenyl)hydrazone—M.P. 100°–105° C.

EXAMPLE 4

Acetaldehyde $N^1$-isonicotinoyl-$N^1$-(p-methoxyphenyl)hydrazone—M.P. 134°–136° C.

EXAMPLE 5

Acetaldehyde $N^1$-(2-thenoyl)-$N^1$-(p-tolyl)hydrazone—M.P. 114°–116° C.

EXAMPLE 6

Acetaldehyde $N^1$-(2-furoyl)-$N^1$-(p-tolyl)hydrazone—M.P. 80°–85° C.

EXAMPLE 7

3.4 g. of p-methoxyphenylhydrazone of methyl levulinate was dissolved in 15 ml. of pyridine. 2.8 g. of p-chlorobenzoyl chloride was dropped into the resultant solution, under cooling with ice and with stirring. After the reaction mixture was allowed to stand for one overnight, it was poured into cold water. As a result, an oily substance was produced. The product was treated with methanol to be purified. Then 2.5 g. of the crystals of $N^1$-(p-methoxyphenyl)-$N^1$-(p-chlorobenzoyl)hydrazine having the formula, $$CH_3O-\langle\text{ }\rangle-\underset{\underset{\underset{\langle\text{ }\rangle}{\underset{Cl}{|}}}{\overset{|}{C=O}}}{N}-NH_2$$

was obtained. Its M.P. was 131°–132° C.

When p-chlorobenzoic anhydride was used in place of p-chlorobenzoyl chloride, $N^1$-(p-methoxyphenyl)-$N^1$-(p-chlorobenzoyl)hydrazine was also obtained, though in a small amount.

By the method of Example 7, the following $N^1$-acylated hydrazine compounds were obtained.

EXAMPLE 8

$N^1$-(2-thenoyl)-$N^1$-(p-tolyl)hydrazine—M.P. 164°–166° C.

EXAMPLE 9

$N^1$-(p-methylphenyl)-$N^1$-(p-chlorobenzoyl)hydrazine—M.P. 124°–125° C.

EXAMPLE 10

9.5 g. of acetaldehyde $N^1$-nicotinoyl-$N^1$-(p-methoxyphenyl)hydrazone was dissolved in 80 ml. of absolute ethanol. Dry hydrogen chloride gas was introduced into the resultant solution, under cooling with ice. Nearly saturated with the gas, it was allowed to stand at room temperature for several hours. Thereafter the solution was concentrated under a reduced pressure, so many crystals were separated. They were collected by filtration, washed with ether and dried. As a result, $N^1$-nicotinoyl-$N^1$-(p-methoxyphenyl)hydrazine hydrochloride was obtained. The product was recrystallized from methanol-ether to give 10.0 g. of the pure product, M.P. 200°–201° C. (decomp.).

Further $N^1$-nicotinoyl-$N^1$-(p-methoxyphenyl)hydrazine hydrochloride was obtained from the hydrazone derivatives of chloral and benzaldehyde, too.

EXAMPLE 11

11 g. of acetaldehyde $N^1$-(2-thenoyl)-$N^1$-(p-methoxyphenyl)hydrazone was dissolved in 80 ml. of absolute ethanol. Into the resultant solution, under cooling with ice, dry hydrogen chloride gas was introduced. Nearly saturated with the gas, it was allowed to stand at room temperature. Then nitrogen gas was passed through it at room temperature until many crystals were separated. They were collected by filtration, washed with ether and dried. As a result, 6.0 g. of $N^1$-(2-thenoyl)-$N^1$-(p-methoxyphenyl)hydrazine hydrochloride was obtained. Its M.P. was 165°–166° C. (decomp.). When hydrochloric acid was liberated from it with an aqueous solution of sodium carbonate, free crystals of $N^1$-(2-thenoyl)-$N^1$-(p-methoxyphenyl)hydrazine were obtained. Its M.P. was 158°–160° C. When the product was recrystallized from alcohol, its melting point was raised up to 160°–161° C.

EXAMPLE 12

By the method of Example 10, $N^1$-(2-furoyl)-$N^1$-(p-tolyl)hydrazine hydrochloride was obtained. Its M.P. was 180°–181° C. (decomp.).

EXAMPLE 13

By the method of Example 10, $N^1$-isonicotinoyl-$N^1$-(p-methoxyphenyl)hydrazine hydrochloride was obtained. Its M.P. was 148° C. (decomp.). When the product was recrystallized from alcohol-ether, pure product, M.P. 149.5° C. (decomp.) was obtained.

EXAMPLE 14

20 g. of acetaldehyde $N^1$-(p-methylphenyl)-$N^1$-(p-chlorobenzoyl)hydrazone was dissolved in 170 ml. of absolute ethanol. Into the resultant solution, dry hydrogen chloride gas was introduced. Thereafter 150 ml. of ether was added to it. Then crystals were separated. They were collected by filtration and dried. As a result, 10.9 g. of the crystals of $N^1$-(p-methylphenyl)-$N^1$-(p-chlorobenzoyl)hydrazine hydrochloride was obtained. Its M.P. was 192°–193° C. (decomp.).

EXAMPLE 15

By the method of Example 14, $N^1$-(p-fluorophenyl)-$N^1$-(p-chlorobenzoyl)hydrazine hydrochloride was obtained. Its M.P. was 209°–211° C. (decomp.).

EXAMPLE 16

By the method of Example 14, $N^1$-(m-methylphenyl)-$N^1$-(p-chlorobenzoyl)hydrazine hydrochloride was obtained. Its M.P. was 162°–163.5° C. (decomp.).

EXAMPLE 17

15 g. of benzaldehyde $N^1$-phenyl-$N^1$-(p-methylbenzoyl) hydrazone was dissolved in absolute ethanol. Into the resultant solution, dry hydrogen chloride gas was introduced. After the solution was allowed to stand at room temperature for one overnight, it was concentrated under a reduced pressure to about 30 ml., when the solution thus concentrated was cooled with ice, a large amount of precipitate was obtained. The precipitate was collected by filtration and dried to give 10.2 g. of $N^1$-(p-methylbenzoyl)-$N^1$-phenylhydrazine hydrochloride, M.P. 190°–192° C. (decomp.).

EXAMPLE 18

By the method of Example 17, $N^1$-(2-thenoyl)-$N^1$-(p-tolyl)hydrazine hydrochloride was obtained, M.P. 165°–167° C. (decomp.).

EXAMPLE 19

17 g. of acetaldehyde $N^1$-(p-methoxyphenyl)-$N^1$-(p-chlorobenzoyl)hydrazone was dissolved in 160 ml. of ethanol. Into the resultant solution, under cooling with ice, dry hydrogen chloride gas was introduced. Then $N^1$-(p-methoxyphenyl)-$N^1$-(p-chlorobenzoyl)hydrazine hydrochloride was separated. Nearly saturated with the gas, the solution was allowed to stand at room temperature for one overnight to separate many crystals. They were collected by filtration and washed with cold ether. As a result, about 12.5 g. of nearly white $N^1$-(p-methoxyphenyl)-$N^1$-(p-chlorobenzoyl)hydrazine hydrochloride was obtained. Its M.P. was 170°–172° C. (decomp.). When the hydrochloride was treated with a 10% aqueous solution of sodium carbonate, 9.5 g. of free $N^1$-(p-methoxyphenyl)-$N^1$-(p-chlorobenzoyl)hydrazine was obtained. Its M.P. was 131°–132° C. When the product was recrystallized from methanol, its pure product, M.P. 134° C., was obtained.

EXAMPLE 20

4.9 g. of $N^1$-nicotinoyl-$N^1$-(p-methoxyphenyl)hydrazine hydrochloride and 17.6 g. of levulinic acid were heated at 75° C. for 3 hours. After the mixture was left at room temperature, it was poured into 50 ml. of cold water. The produced precipitate was collected by filtration and dried. As a result, 5.8 g. of N-nicotinoyl-2-methyl-5-methoxy-3-indolylacetic acid was obtained. Its M.P. was 171°–180° C. When it was recrystallized from acetone-water, its pure product, M.P. 187°–189° C., was obtained.

*Microanalysis.*—Calculated (percent): C, 66.66; H, 4.97; N, 8.64. Found (percent): C, 67.02; H, 5.22; N, 8.69.

Its main infrared absorption spectrum, $\lambda_{max.}^{Nujol}$ (cm.$^{-1}$): 1710, 1670.

By the same method as in Example 20, the hydrochloride of a corresponding phenylhydrazine derivative and a corresponding aliphatic acid derivative were heated at 72°–75° C. for 2.5–3.5 hours to react with each other. As a result, the following 3-indolyl aliphatic acid derivatives were obtained in good yields.

EXAMPLE 21

N-(2'-thenoyl)-2-methyl-5-methoxy-3-indolyl acetic acid—M.P. 65°–67° C.

EXAMPLE 22

N-(2'-furoyl)-2,5-dimethyl-3-indolylacetic acid—M.P. 160°–163° C.

EXAMPLE 23

γ{N-(2'-thenoyl)-2-methyl-5-methoxy-3-indolyl} butyric acid—M.P. 118°–120° C.

EXAMPLE 24

9 g. of $N^1$-isonicotinoyl-$N^1$-(p-methoxyphenyl)hydrazine hydrochloride and 4 g. of levulinic acid were added to 25 ml. of acetic acid. The mixture was heated at 75° C. with stirring for 3 hours. After it was left at room temperature, 100 ml. of water was added to it. The precipitate thus separated was collected by filtration and dried. As a result, 4.3 g. of crude crystals of N-isonicotinoyl-2-methyl-5-methoxy-3-indolylacetic acid were obtained. Its M.P. was 146°–149° C. When the product was recrystallized from acetone, its pure product, M.P. 163–164.5° C. was obtained.

*Microanalysis.*—Calculated (percent): C, 66.66; H, 4.97; N, 8.64. Found (percent): C, 66.92; H, 4.83; N, 8.52.

Its main infrared absorption spectrum, $\lambda_{max.}^{Nujol}$ (cm.$^{-1}$):

1710, 1670.

When cyclohexane, formic acid, n-hexane, dioxane or butyric acid was used as the solvent in place of acetic acid, the aimed 3-indolyl aliphatic acid derivative was obtained in a good yield under the same reaction conditions in each case.

By the same method as in Example 24, the hydrochloride of a corresponding phenylhydrazine derivative and a corresponding aliphatic acid derivative were heated at 70–80° C. for 2.5–4 hours to react with each other in acetic acid as the solvent. As a result, the following 3-indolyl aliphatic acid derivatives were obtained in good yields.

EXAMPLE 25

β{N-(2'-furoyl)-2,5-dimethyl-3-indolyl} propionic acid—M.P. 95°–98° C.

EXAMPLE 26

γ{N-(2'-thenoyl)-2-methyl-5-methoxy-3-indolyl}butyric acid—M.P. 119°–120° C.

EXAMPLE 27

A mixture of N-(p-chlorobenzoyl)-2,4-dimethyl- and 2,6-dimethyl-3-indolylacetic acid—M.P. 182°–190° C.

EXAMPLE 28

9 g. of $N^1$-isonicotinoyl-$N^1$-(p-methoxyphenyl)-hydrazine hydrochloride and 4.3 g. of methyl levulinate were added to 40 ml. of methanol. The mixture was refluxed with stirring for 5 hours. After the reaction was finished, the methanol solution was concentrated under reduced pressure to produce a precipitate. The precipitate was collected by filtration. As a result, crude crystals of methyl N-isonicotinoyl-2-methyl-5-methoxy-3-indolylacetate was obtained almost quantitatively. When the crude crystals were recrystallized from methanol, the pure product, M.P. 113°–115° C., was obtained.

EXAMPLE 29

Methyl N-(5'-chloro-2'-thenoyl)-2-methyl-5-methyl-5-methylthio-3-indolylacetate, an oily substance.

EXAMPLE 30

Dimethyl N-(2'-furoyl)-5-chloro-3-indolylmalonate, an oily substance.

EXAMPLE 31

Methyl N-nicotinoyl-2-methyl-5-methoxy-3-indolylacetate—M.P. 132°–135° C.

EXAMPLE 32

3 g. of $N^1$-(p-chlorobenzoyl)phenylhydrazine hydrochloride and 9.3 g. of levulinic acid were heated at 80° C. for 4.5 hours. After the mixture was left at room temperature, 50 ml. of water was added to it. The precipitate thus separated was collected by filtration and dried. As a result, 3.6 g. of crude crystals of N-(p-chlorobenzoyl)-2-methyl-3-indolylacetic acid were obtained. When the product was recrystallized from ethanol-water, its pure product, M.P. 124–127° C., was obtained.

*Microanalysis.*—Calculated (percent): C, 65.96; H, 4.30; N, 4.27; Cl, 10.82. Found (percent): C, 65.66; H, 4.21; N, 4.38; Cl, 10.78.

Further, while it was cooled, the sodium salt of the compound was obtained by an aqueous solution of caustic soda.

EXAMPLE 33

5 g. of $N^1$ - (p-chlorobenzoyl)-$N^1$-(p-methoxyphenyl)-hydrazine hydrochloride and 10 g. of acetovaleric acid were heated at 80° C. for 3 hours and then left at room temperature. The mixture was added to 50 ml. of water. The precipitate thus separated was collected by filtration, dried and recrystallized from acetone-water. As a result, 4.3 g. of γ-{N1(p-chlorobenzoyl)-2-methyl-5-methoxy-3-indolyl}butyric acid was obtained. Its M.P. was 106°–109° C.

*Microanalysis.*—Calculated (percent): C, 65.37; H, 5.22; N, 3.62; Cl, 9.19. Found (percent): C, 64.94; H, 5.21; N, 3.48; Cl, 9.00.

By similar methods to those of Examples 32 and 33, the salt of an $N^1$-aroyl-$N^1$-phenylhydrazine derivative and a keto-aliphatic acid derivative were heated without solvent to react with each other to produce the following compounds in good yields.

EXAMPLE 34

N - (p-chlorobenzoyl) - 2 - methyl-5-chloro-3-indolylacetic acid—M.P. 185°–187° C.

EXAMPLE 35

N - (p - chlorobenzoyl) - 2,5-dimethyl-3-indolylacetic acid—M.P. 207°–209° C.

EXAMPLE 36

N - (p - chlorobenzoyl) - 2-methyl-5-fluoro-3-indolylacetic acid—M.P. 149°–151° C.

EXAMPLE 37

N - benzoyl - 2,5 - dimethyl-3-indolyacetic acid—M.P. 165°–167° C.

EXAMPLE 38

N - (p - methylbenzoyl) - 2-methyl-5-methoxy-3-indolylacetic acid—M.P. 155°–156° C.

EXAMPLE 39

N - (p - methoxybenzoyl) - 2 - methyl-5-methoxy-3-indolylacetic acid—M.P. 158°–160° C.

EXAMPLE 40

α-{N - (p - chlorobenzoyl) - 2 - methyl-5-methoxy-3-indolyl}-propionic acid—M.P. 87°–88° C.

EXAMPLE 41

N - benzoyl - 2 - methyl-5-chloro-3-indolylacetic acid—M.P. 170°–171° C.

EXAMPLE 42

N - benzoyl - 2 - methyl - 3-indolylacetic acid—M.P. 167°–168° C.

EXAMPLE 43

N - (p - trifluoromethylbenzoyl)-2-methyl-3-indolylacetic acid—M.P. 169°–171° C.

EXAMPLE 44

5.1 g. of $N^1$ - (p-methoxyphenyl)-$N^1$-(p-methoxybenzoyl)hydrazine hydrochloride and 2.2 g. of levulinic acid were added to 10 ml. of acetic acid. The mixture was heated at 80° C. with stirring for 3 hours. After it was left at room temperature 50 ml. of water was added to it. The separated precipitate was collected by filtration, dried and recrystallized from ether and petroleum ether. As a result, 2.2 g. of white crystals of N-(p-methoxybenzoyl)-2-methyl-5-methoxy-3-indolylacetic acid were obtained, M.P. 158°–160° C.

*Microanalysis.*—Calculated (percent): C, 67.98; H, 6.42; N, 3.96. Found (percent): C, 68.57; H, 5.85; N, 4.05.

In the reaction, even if cyclohexane, formic acid, lactic acid, n-hexane, dioxane or butyric acid was used in place of acetic acid, the product was obtained in a similar yield.

EXAMPLE 45

2.4 g. of N-benzoyl-$N^1$-phenylhydrazine hydrochloride and 1.1 g. of levulinic acid were added to 8 ml. of acetic acid. The mixture was heated at 80° C. with stirring for 5 hours. After cooling, it was extracted with about 200 ml. of dry ether and the ether was distilled off to give an oily substance. When 60 ml. of a 30% aqueous solution of acetic acid was added, pale yellow crystals were produced, collected by filtration and washed with a 50% aqueous solution of acetic acid. As a result, 1.7 g. of white N-benzoyl-2-methyl-3-indolylacetic acid was obtained. Its M.P. was 167°–168° C.

*Microanalysis.*—Calculated (percent): C, 73.72; H, 5.12; N, 4.78. Found (percent): C, 73.33; H, 5.11; N, 5.00.

When the salt of a $N^1$-aroyl-$N^1$-phenylhydrazine derivative and an almost equimolar aliphatic acid derivative were heated to react in an adequate solvent, for example, cyclohexane, n-hexane, dioxane, acetic acid, formic acid, lactic acid or butyric acid, by the similar methods of Examples 44 and 45, the following corresponding 1-aroyl-3-indolyl aliphatic acid derivatives were obtained in good yields.

EXAMPLE 46

N - (p - chlorobenzoyl) - 2-methyl-5-chloro-3-indolylacetic acid—M.P. 186°–188° C.

EXAMPLE 47

N - (p - chlorobenzoyl) - 2,5-dimethyl-3-indolylacetic acid—M.P. 206°–209° C.

EXAMPLE 48

N - (p - methylbenzoyl)-2-methyl-5-methoxy-3-indolylacetic acid—M.P. 154°–156° C.

EXAMPLE 49

N - benzoyl - 2 - methyl-5-chloro-3-indolylacetic acid—M.P.169°–172° C.

EXAMPLE 50

N - (p - methoxybenzoyl) - 2-methyl-5-methoxy-3-indolylacetic acid—M.P. 158°–160° C.

EXAMPLE 51

α - {N - (p - methylthiobenzoyl)-2-methyl-5-methoxy-3-indolyl}propionic acid—M.P. 172°–174° C.

EXAMPLE 52

N - (p-methylbenzoyl)-2-methyl-3-indolylacetic acid—M.P. 141°–143° C.

EXAMPLE 53

2.8 g. of $N^1$-(p-chlorobenzoyl)-$N^1$-(p-fluorophenyl)-hydrazine hydrochloride and 1.8 g. of t-butyl levulinate were heated at 80° C. with stirring in 10 ml. of t-butanol for 8 hours. After the mixture was allowed to stand for one over night, the t-butanol was distilled off under reduced pressure and the residue was washed carefully with ethanol-water. As a result, 1.5 g. of pale yellow t-butyl-(p-chlorobenzoyl)-2-methyl-5-fluoro-3-indolylacetate was obtained, M.P. 65°–68° C.

In the synthesis of an N-aroyl-3-indolyl aliphatic acetate, in which a corresponding $N^1$-aroyl-$N^1$-phenylhydrazine derivative and a corresponding ester of aliphatic acid react, if a corresponding alcohol or the ester itself was used as the solvent, the aimed N-aroylindolyl aliphatic acid ester derivative was obtained.

By a similar method to that of Example 53, the following derivatives were obtained.

EXAMPLE 54

Ethyl N-(p-methoxybenzoyl) - 5-methoxy-3-indolylacetate, an oily substance.

EXAMPLE 55

Benzyl N-benzoyl - 2-methyl-5-methoxy-3-indolylacetate—M.P. 85°–87° C.

EXAMPLE 56

Methyl N-(p-chlorobenzoyl) - 2 - methyl-5-nitro-3-indolylacetate—M.P. 153°–157° C.

EXAMPLE 57

Methyl N-(β-naphthoyl) - 2 - methyl-5-methoxy-3-indolylacetate—M.P. 124°–126° C.

EXAMPLE 58 tButyl N-(p-methylthiobenzoyl)-2-methyl-5-methoxy-3-indolylacetate, an oily substance.

EXAMPLE 59

Diethyl N-(p-chlorobenzoyl) - 2 - methyl-5-methoxy-3-indolylmalonate

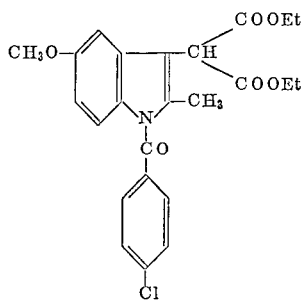

M.P. 70°–71° C.

EXAMPLE 60

Ethyl N-benzoyl - 2 - methyl - 3-indolylcarboxylate—M.P. 96°–98° C.

EXAMPLE 61

2 g. of $N^1$-(p-methoxyphenyl)-$N^1$-(p-chlorobenzoyl) hydrazine hydrochloride and 8.5 g. of levulinic acid were heated at 70° C. with stirring for 3 hours. After allowed to stand at room temperature for one over night, the mixture was washed thoroughly with 60 ml. of cold water. As a result, light brown crude crystals of N-(p-chlorobenzoyl) - 2-methyl-5-methoxy-3-indolylacetic acid were obtained quantitatively. Its M.P. was 144°–148° C. When they were recrystallized from ethyl ether, the white pure product, M.P. 157°–158° C., was obtained.

*Microanalysis.*—Calculated (percent): C, 63.78; H, 4.48; N, 3.92; Cl, 9.93. Found (percent): C, 63.95; H, 4.46; N, 3.88; Cl, 10.11.

Molecular weight: Calculated, 357.5; found, 358 (by Rast method)

Main infrared absorption spectrum, $\lambda_{max.}^{Nujol}$ (cm.$^{-1}$): 1685, 1472, 1310, 1218, 1145

EXAMPLE 62

3 g. of $N^1$-(p-methoxyphenyl)-$N^1$-(p-chlorobenzoyl) phenylhydrazine hydrochloride and 1.3 g. of methyl levulinate were added to 25 ml. of methanol. The mixture was refluxed slowly for 8 hours. After it was allowed to stand for one over night, the methanol was distilled off under reduced pressure and the residue was washed well with water. As a result, light brown crude crystals of methyl N-(p-chlorobenzoyl) - 2-methyl-5-methoxy-3-indolylacetate were obtained quantitatively. When they were recrystallized from methanol-water, the almost white pure product, M.P. 89°–90° C., was obtained.

*Microanalysis.*—Calculated (percent): C, 64.60; H, 4.87; N, 3.77; Cl, 9.54. Found (percent): C, 64.37; H, 5.00; N, 3.74; Cl, 9.60.

Molecular weight: Calculated, 371.5; found, 372 (by Rast method)

Main infrared absorption spectrum, $\lambda_{max.}^{Nujol}$ (cm.$^{-1}$): 1732, 1670, 1322, 1188, 1168

Ultra-violet absortpion spectrum, $\lambda_{max.}^{EtOH}$ (m$\mu$): 319

EXAMPLE 63

4.3 g. of $N^1$-(p-ethoxyphenyl)-$N^1$-(p-chlorobenzoyl)-hydrazine hydrochloride and 12.4 g. of levulinic acid were heated at 80° C. for 3 hours and then allowed to stand at room temperature for one over night.

50 ml. of water was added to the reaction mixture and the produced precipitate was collected by filtration and dried. As a result, 7.2 g. of crude crystals of N-(p-chlorobenzoyl) - 2-methyl-5-ethoxy-3-indolylacetic acid were obtained. When they were recrystallized from ethanol-water, crystals, M.P. 161°–164° C., were obtained.

*Microanalysis.*—Calculated (percent): C, 64.60; H, 4.87; N, 3.76; Cl, 9.86. Found (percent): C, 64.56; H, 4.73; N, 3.43; Cl, 9.62.

In the reaction, even if a sulfate or phosphate of the hydrazine derivative was used in place of its hydrochloride, the similar result was obtained.

EXAMPLE 64

9.0 g. of $N^1$-(p-methoxyphenyl)-$N^1$-(p-bromobenzoyl)-hydrazine hydrochloride, 3.5 g. of levulinic acid and 11 ml. of acetic acid were heated at 80° C. for 3 hours. After the mixture was left at room temperature, water was added and the separated crystals were collected by filtration and dried, As a result, 10.0 g. of crude crystals of N - (p-bromobenzoyl)-2-methyl-5-methoxy-3-indolylacetic acid were obtained. When they were recrystallized from ethanol-water, 8.3 g. of white crystals, M.P. 162°–164° C. were obtained.

*Microanalysis.*—Calculated (percent): C, 56.74; H, 4.00; N, 3.48; Br, 19.87. Found (percent): C, 57.15; H, 4.18; N, 3.37; Br, 19.73.

EXAMPLE 65

11.4 g. of $N^1$-(p-methoxyphenyl)-$N^1$-(p-fluorobenzoyl)-hydrazine hydrochloride and 35.3 g. of levulinic acid were heated at 80° C. for 3 hours. After the mixture was left at room temperature, 50 ml. of water was added to it, and the separated crystals were collected by filtration and dried. As a result, 10.1 g. of crude crystals of N-(p - fluorobenzoyl) - 2 - methyl - 5 - methoxy - 3 - indolylacetic acid were obtained. When they were recrystallized from ethanol-water, 7.5 g. of white crystals, M.P. 148°–150° C., were obtained.

*Microanalysis.*—Calculated (percent): C, 66.85; H, 4.72; N, 4.10. Found (percent): C, 66.54; H, 4.68; N, 4.04.

EXAMPLE 66

7.5 g. of $N^1$-(p-methoxyphenyl)-$N^1$-(p-chlorobenzoyl)-hydrazine hydrochloride and 5 g. of levulinic acid amide were added to 10 ml. of acetic acid and further zinc chloride was added. The mixture was heated under stirring. The resultant precipitate was collected by filtration and recrystallized from alcohol-water. As a result, N-(p-chlorobenzoyl) - 2 - methyl - 5 - methoxy - 3 - indolylacetamide was obtained. Its M.P. was 216°–218° C.

EXAMPLE 67

1 g. of $N^1$-(p-methoxyphenyl)-$N^1$-(p-chlorobenzoyl) hydrazine hydrochloride and 1 g. of acetonylmalonic acid were heated at 145° C. for 5 minutes and then the temperature was lowered slowly. After the mixture was cooled, it was dissolved with adding 2 ml. of acetic acid. 5 ml. of water was added and crystals thus produced were collected by filtration and dried. As a result, 1.2 g. of powder was obtained. The powder was recrystallized from ether-petroleum ether and then from ethanol-water. Thus 0.6 g. of white crystals of 1-(p-chlorobenzoyl)-2-methyl-5-methoxy-3-indolylacetic acid were obtained. Its M.P. was 150°–153° C.

In the reaction, even if the mixture was heated at about 80° C. in acetic acid, N-(p-chlorobenzoyl)-2-methyl-5-methoxy-3-indolylacetic acid was obtained in almost the same yield.

By the same method, the following N-aroyl-3-indolyl aliphatic acid derivatives were obtained.

EXAMPLE 68

N-(p-chlorobenzoyl)-3-methyl - 5 - chloro - 3 - indolylacetic acid—M.P. 184°–186° C.

EXAMPLE 69

N-(p-chlorobenzoyl)-2,5-dimethyl - 3 - indolylacetic acid—M.P. 208°–209° C.

EXAMPLE 70

N - benzoyl-2-methyl-5-chloro - 3 - indolyacteic acid—M.P. 170°–172° C.

EXAMPLE 71

N-(p-methylbenzoyl)-2-methyl - 5 - methoxy - 3 - indolylacetic acid—M.P. 155°–156° C.

EXAMPLE 72

N-(p-methoxybenzoyl) - 2 - methyl - 5 - methoxy - 3-indolylacetic acid—M.P. 159°–161° C.

EXAMPLE 73

N-(p-chlorobenzoyl)-2-methyl - 5 - methoxy - 3 - indolylacetic acid—M.P. 107°–110° C.

EXAMPLE 74

α-{N-(p-methylthiobenzoyl) - 2 - methyl - 5 - methoxy-3-indolyl}-propionic acid—M.P. 173°–175° C.

EXAMPLE 75

N-(p-bromobenzoyl)-2-methyl - 5 - methoxy - 3 - indolylacetic acid—M.P. 162°–164° C.

EXAMPLE 76

N-(p-chlorobenzoyl)-2-methyl - 3 - indolylacetic acid—M.P. 125°–127° C.

EXAMPLE 77

2.4 g. of $N^1$-nicotinoyl-$N^1$-(p-methoxyphenyl)-hydrazine hydrochloride and 2.0 g. of acetonylmalonic acid were heated at 85° C. with stirring in 10 ml. of acetic acid for 3 hours. After left cooling, the mixture was added to 25 ml. of water to produce the precipitate, which was then collected by filtration and dried. As a result, 2.1 g. of crude crystals of N-nicotinoyl-2-methyl-5-methoxy-3-indolylacetic acid were obtained. When they were recrystallized from acetone, the pure product, M.P. 188°–189° C., was obtained.

*Microanalysis.*—Calculated (percent): C, 66.66; H, 4.97; N, 8.64. Found (percent): C, 66.82; H, 5.13; N, 8.43.

Further, even if $N^1$ - nicotinoyl - $N^1$ - (p - methoxyphenyl)-hydrazine hydrochloride and acetonylmalonic acid were fused without solvent, the aimed product was obtained, too.

When a corresponding hydrazine derivative and a corresponding dicarboxylic acid derivative were heated with stirring for 3–4 hours in acetic acid, similarly to the above example, the following were obtained.

EXAMPLE 78

N - isonicotinoyl - 2 - methyl - 5 - methoxy - 3 - indolyl acetic acid—M.P. 145°–147° C.

EXAMPLE 79

N - (2' - thenoyl) - 2 - methyl - 5 - methoxy - 3 - indolylbutyric acid—M.P. 118°–121° C.

EXAMPLE 80

N - (2' - furoyl) - 2,5 - dimethyl - 3 - indodylacetic acid—M.P. 161°–163° C.

EXAMPLE 81

β - {N - (2' - furoyl) - 2,5 - dimethyl - 3 - indolyl} propionic acid—M.P. 92°–95° C.

EXAMPLE 82

9.0 g. of $N^1$ - nicotinoyl - $N^1$ - (p - methoxyphenyl) hydrazine hydrochloride, 4.5 g. of levulinic acid and 60 ml. of methanol were refluxed for 16 hours. After the mixture was allowed to stand for one over night, the methanol was distilled off and the residue was washed well with 5% sodium carbonate aqueous solution. As a result, light brown methyl N-nicotinoyl-2-methyl-5-methoxy-3-indolylacetate was obtained. When the product was recrystallized from methanol and water, the pure product, M.P. 133°–135° C., was obtained.

*Microanalysis.*—Calculated (percent): C, 67.44; H, 5.36; N, 8.28. Found (percent): C, 67.20; H, 5.00; N, 7.94.

Similarly to the above example, the following oily substances were obtained.

EXAMPLE 83

Ethyl N - (2 - thenoyl) - 2 - methyl - 5 - methoxyindolylacetate.

EXAMPLE 84

Methyl N - (5 - chloro - 2 - thenoyl) - 2 - methyl-5-methoxyindolylacetate.

EXAMPLE 85

Methyl N - (2 - furoyl) - 2 - methyl - 5 - methoxyindolylacetate.

EXAMPLE 86

6.0 g. of $N^1$ - (p - methoxyphenyl) - $N^1$ - (p - chlorobenzoyl)-hydrazine hydrochloride, 2.9 g. of levulinic acid and 40 ml. of absolute methanol were refluxed for 16 hours. After the mixture was allowed to stand for one over night, the methanol was distilled off and the residue was washed well with water. As a result, 4.8 g. of light brown crude crystals of methyl 1 - (p - chlorobenzoyl)-2 - methyl - 5 - methoxy - 3 - indolylacetate was obtained. When they were recrystallized from methanol-water, white crystals, M.P. 88°–91° C., were obtained.

EXAMPLE 87

5.0 g. of $N^1$ - (p - methoxyphenyl) - $N^1$ - (p - chlorobenzoyl)-hydrazine, 3.0 g. of levulinic acid and 30 ml.

of absolute ethanol, with a small amount of hydrochloric acid added to them, were refluxed for 8 hours. Thereafter the ethanol was distilled off and water was added. Precipitate thus produced was collected by filtration and washed well with ethanol-water. As a result, crude crystals of ethyl 1 - (p - chlorobenzoyl) - 2 - methyl - 5 - methoxy-3-indolylacetate, M.P. 92°–95° C., were obtained.

Similarly to Example 86 or 87, the following compounds were obtained.

EXAMPLE 88

Methyl 1 - (p - chlorobenzoyl) - 2 - methyl - 5 - nitro-3-indolylacetate—M.P. 165°–167° C.

EXAMPLE 89

Methyl 1 - (p - bromobenzoyl) - 2 - methyl - 5 - methoxy-3-indolylacetate—M.P. 105°–107° C.

EXAMPLE 90

Ethyl 1 - (p - chlorobenzoyl) - 2 - methyl - 5 - methoxy-3-indolylcarboxylate—M.P. 97°–98° C.

EXAMPLE 91

Methyl 1 - (β - naphthoyl) - 2 - methyl - 5 - methoxy-3-indolylacetate—M.P. 125°–128° C.

EXAMPLE 92

Methyl γ-{1 - (p - chlorobenzoyl) - 5 - methyl - 3 - indolyl}butyrate, an oily substance.

EXAMPLE 93

9.1 g. of acetaldehyde - $N^1$ - (p - chlorobenzoyl)-$N^1$-(p-methoxyphenyl)hydrazone was added to 50 g. of levulinic acid. Into the mixture, under cooling with ice, 1.46 g. of dry hydrogen chloride gas was introduced. Then the temperature was slowly raised and the mixture was heated at 76° C. for 1.5 hours. After the reaction mixture was allowed to stand for one over night, a large amount of water was added to it. As a result, a resinous substance produced. The product was dissolved in alcohol or chloroform. The solution was purified by passing it through an active carbon or silica column and then recrystallized from acetone-water. Thereby needle crystals of N-(p-chlorobenzoyl) - 2 - methyl - 5 - methoxy - 3 - indolylacetic acid were obtained.

The melting point of the product was 142°–144° C. By repeating its recrystallization further, its pure product, M.P. 150°–151° C., was obtained.

The following compounds were produced similarly.

EXAMPLE 94

N-nicotinyol-2-methyl-5-methoxy-3-indolylacetic acid—M.P. 184°–186° C.

EXAMPLE 95

N-(2'-furoyl)-2,5-dimethyl-3-indolylacetic acid—M.P. 159°–161° C.

EXAMPLE 96

γ-{N-(2'thenoyl)-2-methyl - 5 - methoxy - 3 - indoyl}butyric acid—M.P. 118°–120° C.

EXAMPLE 97

N-isonicotinoyl-2-methyl-5-methoxy - 3 - indolylacetic acid—M.P. 163°–165° C.

EXAMPLE 98

Methyl N-nicotinoyl-2-methyl-5- methoxy - 3 - indolylacetate—M.P. 128°–130° C.

EXAMPLE 99

N-(p-chlorobenzoyl)-2-methyl - 3 - indolylacetic acid—M.P. 124°–127° C.

EXAMPLE 100

γ-{N-(p-chlorobenzoyl) - 2 - methyl - 5 - methoxy-3-indolyl}-butyric acid—M.P. 106°–109° C.

EXAMPLE 101

N-(p-chlorobenzoyl)-2-methyl - 5 - fluoro - 3 - indolylacetic acid—M.P. 149°–151° C.

EXAMPLE 102

N-benzoyl-2,5-dimethyl - 3 - indolylacetic acid—M.P. 163°–166° C.

EXAMPLE 103

N-(p-methylbenzoyl)-2-methyl-5-methoxy - 3 - indolylacetic acid—M.P. 154°–156° C.

EXAMPLE 104

N-(p-methoxybenzoyl) - 2 - methyl - 5 - methoxy-3-indolylacetic acid—M.P. 158°–160° C.

EXAMPLE 105

N-benzoyl-2-methyl-5-chloro - 3 - indolylacetic acid—M.P. 165°–168° C.

EXAMPLE 106

N-benzoyl-2-methyl-3-indolylacetic acid—M.P. 167°–168° C.

EXAMPLE 107

N-(p-bromobenzoyl)-2-methyl-5-methoxy - 3 - indolylacetic acid—M.P. 163°–164° C.

EXAMPLE 108

N-(p-fluorobenzoyl)-2-methyl-5-methoxy - 3 - indolylacetic acid—M.P. 149°–150° C.

EXAMPLE 109

4.6 g. of acetaldehyde $N^1$-(p-methoxyphenyl)-$N^1$-(p-chlorobenzoyl)hydrazone and 4.8 g. of acetonylmalonic acid were added to 10 ml. of acetic acid containing 0.8 g. of dry hydrochloric acid.

The mixture was heated at 80°–100° C. with stirring for 1.5 hours. After it was added to cold water, the mixture was stirred sufficiently. As a result, a resinous substance was obtained. The substance was purified by separation through column chromatography and recrystallization from acetone-water. As a result, N-(p-chlorobenzoyl)-2-methyl-5-methoxy-3-indolylacetic acid was obtained. Its melting point was 150°–152° C.

Similarly the following compounds were produced.

EXAMPLE 110

N-nicotinoyl-2-methyl-5-methoxy-3-indolylacetic acid—M.P. 187°–189° C.

EXAMPLE 111

N-(2'-furoyl)-2,5-dimethyl - 3 - indolylacetic acid—M.P. 158°–161° C.

EXAMPLE 112

N-(p-chlorobenzoyl)-2,5-dimethyl - 3 - indolylacetic acid—M.P. 202°–205° C.

EXAMPLE 113

N-(p-methylbenzoyl)-2-methyl-5-methoxy - 3 - indolylacetic acid—M.P. 154°–156° C.

What we claim is:

1. A process for producing 3-indolyaliphatic acid compounds of the formula,

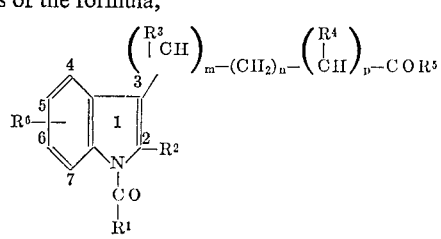

(1)

wherein $R^1$ is an unsubstituted or lower alkyl-, lower alkoxy-, lower alkylthio- or halogen-substituted phenyl or naphthyl, or an unsubstituted or halogen- or lower alkyl-substituted pyridyl, furyl, thenyl, thiazyl, pyrimidyl, pyrazyl or piperidinyl, $R^2$ and $R^3$ are hydrogen atoms or lower alkyl, $R^4$ is a hydrogen atom or a carboxy or a lower alkoxycarbonyl, $R^5$ is an alkoxy having 4 or less carbon atoms, benzyloxy, amino or hydroxy, $R^6$ is a lower alkyl, lower alkoxy, lower alkylthio or nitro or a halogen atom at the position of 4, 5 or 6, $m$ and $p$ are 0 or 1 and $n$ is 0 or an integer of from 1 to 3, which comprises reacting at an elevated temperature an $N^1$-acylated phenylhydrazine compound of the formula,

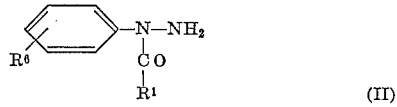

(II)

wherein $R^1$ and $R^6$ have the same meanings as defined above and $R^6$ is at meta or para position of hydrazino group in this case, with an aliphatic acid compound of the formula,

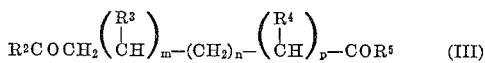

(III)

wherein $R^2$, $R^3$, $R^4$, $R^5$, $m$, $n$ and $p$ have the same meanings as identified above to yield the 3-indolyl aliphatic acid compound (I).

2. A process for producing 3-indolyl aliphatic acid compounds according to claim 1 wherein $R^1$ is an unsubstituted or lower alkyl-, lower alkoxy-, lower alkylthio- or halogen-substituted phenyl or an unsubstituted or halogen- or lower alkyl-substituted pyridyl.

3. A process for producing 3-indolyl aliphatic acid compounds according to claim 2 wherein $R^2$ is lower alkyl, $R^3$ is hydrogen, $R^4$ is hydrogen, $R^5$ is alkoxy having four or less carbon atoms or hydroxy, $R^6$ is a lower alkyl or lower alkoxy.

4. A process according to claim 1 for producing N-(p-chlorobenzoyl)-2-methyl-5-methoxy-3-indolylacetic acid which comprises reacting $N^1$-(p-chlorobenzoyl) phenylhydrazine or the acid addition salt thereof with levulinic acid.

5. A process according to claim 1 for producing N-nicotinoyl-2-methyl-5-methoxy-3-indolylacetic acid which comprises reacting $N^1$-nicotinoyl-$N^1$-(p-methoxyphenyl) hydrazine or the acid addition salt thereof with levulinic acid.

6. A process according to claim 1 for producing N-isonicotinoyl-2-methyl-5 - methoxy - 3-indolylacetic acid which comprises reacting $N^1$-isonicotinoyl-$N^1$-(p-methoxyphenyl) hydrazine or the acid addition salt thereof with levulinic acid.

7. A process for producing 3-indolylaliphatic acid compounds of the formula,

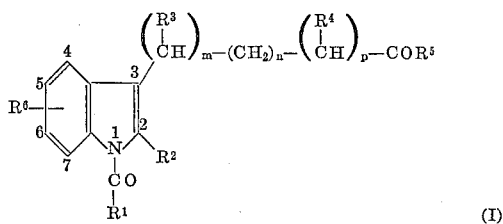

(I)

wherein $R^1$ is an unsubstituted or $C_1$–$C_3$ alkyl-, $C_1$–$C_3$ alkoxy-, $C_1$–$C_3$ alklythio- or halogen-substituted phenyl or naphthyl, or an unsubstituted or halogen- or $C_1$–$C_2$ alkyl-substituted pyridyl, furyl, thenyl, thiazyl, pyrimidyl, pyrazyl or piperidinyl, $R^2$ and $R^3$ are hydrogen atoms or $C_1$–$C_2$ alkyl, $R^4$ is a hydrogen atom or a carboxy or a $C_1$–$C_4$ alkoxycarbonyl, $R^5$ is an alkoxy having 4 or less carbon atoms, benzyloxy, amino or hydroxy, $R^6$ is a $C_1$–$C_3$ alkyl, $C_1$–$C_3$ alkoxy, $C_1$–$C_3$ alkylthio or nitro group or a halogen atom, $m$, $n$ and $p$ are 0 or 1, which comprises reacting an $N^1$-acylated phenylhydrazine compound of the formula,

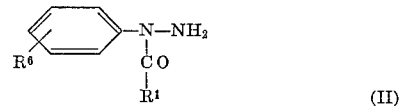

(II)

wherein $R^1$ and $R^6$ have the same meanings as defined above, with an aliphatic acid compound of the formula,

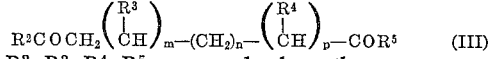

(III)

wherein $R^2$, $R^3$, $R^4$, $R^5$, $m$, $n$ and $p$ have the same meanings as identified above to yield the 3-indolyl aliphatic acid compound (I).

8. A process for producing 3-indolyl aliphatic acid compounds of the formula,

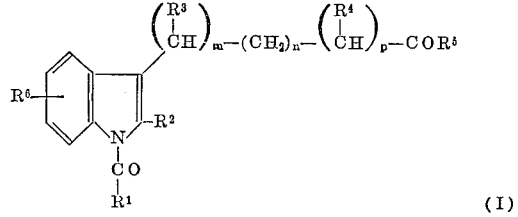

(I)

wherein $R^1$ is an unsubstituted or $C_1$–$C_3$ alkyl-, $C_1$–$C_3$ alkoxy-, $C_1$–$C_3$ alkylthio- or halogen-substituted phenyl or naphthyl, or an unsubstituted or halogen- or $C_1$–$C_2$ alkyl-substituted pyridyl, furyl, thenyl, thiazyl, pyrimidyl, pyrazyl or piperidinyl, $R^2$ and $R^3$ are hydrogen atoms or $C_1$–$C_2$ alkyl, $R^4$ is a hydrogen atom or a carboxy or $C_1$–$C_4$ alkoxycarbonyl, $R^5$ is an alkoxy having 4 or less carbon atoms, benzyloxy, amino or hydroxy, $R^6$ is a $C_1$–$C_3$ alkyl, $C_1$–$C_3$ alkoxy, $C_1$–$C_3$ alkylthio or nitro or a halogen atom, $m$, $n$ and $p$ are 0 to 1, which comprises decomposing an $N^1$-acylated phenyl-hydrazone compound of the formula,

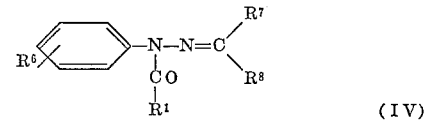

(IV)

wherein $R^1$ and $R^6$ have the same meanings as identified above and $R^7$ and $R^8$ are hydrogen atoms or unsubstituted $C_1$–$C_4$ alkyl or $C_1$–$C_4$ alkyl having one or more halogen, hydroxy, $C_1$–$C_4$ alkoxy or $C_1$–$C_4$ alkoxycarbonyl or phenyl, with a mineral acid to yield an $N^1$-acylated phenylhydrazine compound of the formula,

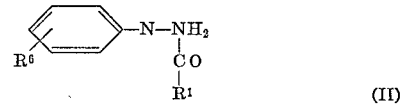

(II)

wherein $R^1$ and $R^6$ have the same meanings as identified above, and reacting the resultant $N^1$-acylated phenylhydrazine compound with an aliphatic acid compound of the formula,

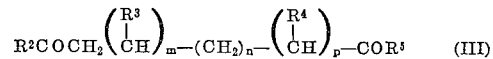

(III)

wherein $R^2$, $R^3$, $R^4$, $R^5$, $m$, $n$ and $p$ have the same meanings as identified above to yield the 3-indolyl aliphatic acid compound (I).

9. A process for producing 3-indolyl aliphatic compounds of the formula,

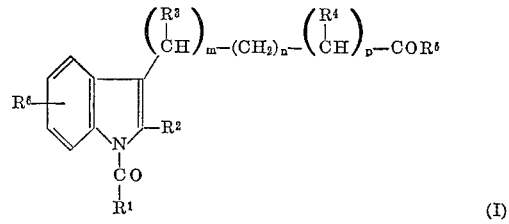

(I)

wherein $R^1$ is an unsubstituted or $C_1$–$C_3$ alkyl-, $C_1$–$C_3$ alkoxy-, $C_1$–$C_3$ alkylthio- or halogen-substituted phenyl or naphthyl, or an unsubstituted or halogen- or $C_1$–$C_2$ alkyl-substituted pyridyl, furyl, thenyl, thiazyl, pyrimidyl, pyrazyl or piperidinyl, $R^2$ and $R^3$ are hydrogen atoms or $C_1$–$C_2$ alkyl, $R^4$ is a hydrogen atom or a carboxy or $C_1$–$C_4$ alkoxycarbonyl, $R^5$ is an alkoxy having 4 or less carbon atoms, benzyloxy, amino or hydroxy, $R^6$ is a $C_1$–$C_3$ alkyl, $C_1$–$C_3$ alkoxy, $C_1$–$C_3$ alkylthio or nitro or a halogen atom, $m$, $n$, and $p$ are 0 or 1, which comprises reacting a phenylhydrazone compound of the formula,

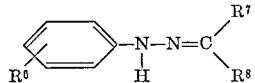 (V)

wherein $R^6$ has the same meaning as identified above and $R^7$ and $R^8$ are hydrogen atoms or unsubstituted $C_1$–$C_4$ alkyl or $C_1$–$C_4$ alkyl having one or more halogen, hydroxy, $C_1$–$C_4$ alkoxy or $C_1$–$C_4$ alkoxycarbonyl or phenyl, with a compound having the formula,

 (VI)

wherein $R^1$ has the same meanings as identified above and Y represents a halogen or R′—CO—O— wherein R′ has the same meanings as identified above to yield an $N^1$-acylated phenylhydrazone compound of the formula,

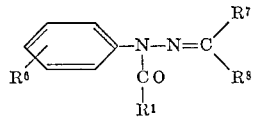 (IV)

wherein $R^1$, $R^6$, $R^7$ and $R^8$ have the same meanings as identified above, decomposing the resultant $N^1$-acylated phenylhydrazone compound with a mineral acid to yield an $N^1$-acylated phenylhydrazine compound of the formula,

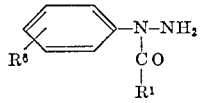 (II)

wherein $R^1$ and $R^6$ have the same meanings as identified above, and reacting the resultant $N^1$-acylated phenylhydrazine compound with an aliphatic acid compound of the formula,

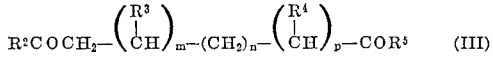 (III)

wherein $R^2$, $R^3$, $R^4$, $R^5$, $m$, $n$ and $p$ have the same meanings as identified above to yield the 3-indolyl aliphatic acid compound (I).

10. A process for producing 3-indolyl aliphatic acid compounds of the formula,

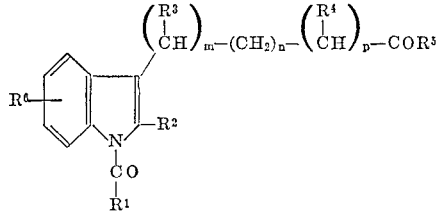

wherein $R^1$ is an unsubstituted or $C_1$–$C_3$ alkyl-, $C_1$–$C_3$ alkoxy-, $C_1$–$C_3$ alkylthio- or halogen-substituted phenyl or naphthyl, or an unsubstituted or halogen- or $C_1$–$C_2$ alkyl-substituted pyridyl, furyl, thenyl, thiazyl, pyrimidyl, pyrazyl or piperidinyl, $R^2$ and $R^3$ are hydrogen atoms or $C_1$–$C_2$ alkyl, $R^4$ is a hydrogen atom or a carboxy or $C_1$–$C_4$ alkoxycarbonyl, $R^5$ is an alkoxy having 4 or less carbon atoms, benzyloxy, amino or hydroxy, $R^6$ is a $C_1$–$C_3$ alkyl, $C_1$–$C_3$ alkoxy, $C_1$–$C_3$ alkylthio or nitro or a halogen atom, $m$, $n$, and $p$ are 0 or 1, which comprises reacting a phenylhydrazone compound of the formula,

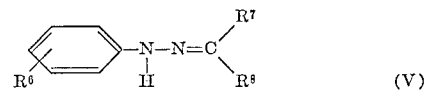 (V)

wherein $R^6$ has the same meaning as identified above, and $R^7$ and $R^8$ are hydrogen atoms or unsubstituted $C_1$–$C_4$ alkyl or $C_1$–$C_4$ alkyl having one or more halogen, hydroxy, $C_1$–$C_4$ alkoxy or $C_1$–$C_4$ alkoxycarbonyl or phenyl, the

bonding of the compound (V) being comparatively weak, with a compound having the formula,

 (VI)

wherein $R^1$ has the same meanings as identified above and Y represents a halogen or R′—CO—O— wherein R′ has the same meanings as identified above, to yield an $N^1$-acylated phenylhydrazine compound of the formula,

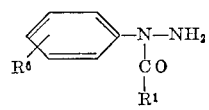 (II)

wherein $R^1$ and $R^6$ have the same meanings as identified above, and reacting at an elevated temperature the resultant $N^1$-acylated phenylhydrazine compound with an aliphatic acid compound of the formula,

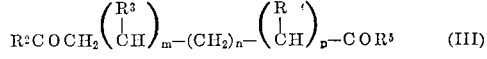 (III)

wherein $R^2$, $R^3$, $R^4$, $R^5$, $m$, $n$, and $p$ have the same meanings as identified above to yield the 3-indolyl aliphatic acid compound (I).

11. A compound of the formula,

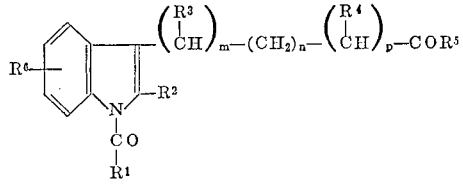

wherein $R^1$ is a halogen-substituted phenyl, $R^2$ and $R^3$ are hydrogen or $C_1$–$C_2$ alkyl, $R^4$ is $C_1$–$C_4$ alkoxycarbonyl, $R^5$ is $C_1$–$C_4$ alkoxy, $R^6$ is a lower alkyl, lower alkoxy, lower alkylthio or nitro, or halogen atom at the position of 4, 5, or 6, $m$ is 0 or 1 and $n$ is 0 or an integer of 1 to 3 and $p$ is 1.

12. A process according to claim 1 wherein compound (II) is reacted with compound (III) at a temperature of from 50 to 200° C.

13. A process according to claim 1 wherein compound (II) is reacted with compound (III) at a temperature of from 65 to 95° C.

14. A process according to claim 1 wherein compound (II) is the acid addition salt thereof.

15. A process according to claim 4 comprising reacting $N^1$-(p-chlorobenzoyl)phenylhydrazine hydrochloride with levulinic acid.

16. A process according to claim 1 wherein compound (II) is reacted with compound (III) in the presence of a condensing agent comprising inorganic acids, metal halides, heavy metal powder, Grignard's reagents, boron fluorides, polyphosphoric acid or ion-exchange resins.

17. A process according to claim 16 wherein the condensinng agent is hydrochloric acid.

18. A process according to claim 17 wherein said inorganic acid is hydrochloric, sulfuric or phosphoric acid, said metal halide is zinc chloride or copper chloride, and said heavy metal powder is copper powder.

19. A process according to claim 8 wherein said mineral acid is hydrochloric acid.

20. A process according to claim 9 wherein Y is halogen and compound (VI) is reacted with compound (V) in the presence of a hydrogen halide acceptor.

21. A process according to claim 20 wherein said hydrogen halide acceptor is a tertiary amine.

22. A process according to claim 21 wherein said tertiary amine is pyridine or dimethylaniline.

23. A process according to claim 9 wherein Y is halogen.

24. A process according to claim 10 wherein Y is halogen.

25. A compound according to claim 11 which is diethyl N-(p-chlorobenzoyl)-2-methyl - 5 - methoxy-3 - indolylmalonate.

References Cited

UNITED STATES PATENTS

| | | | |
|---|---|---|---|
| 3,161,654 | 12/1964 | Shen | 260—326.12 |
| 3,201,414 | 8/1965 | Shen | 260—326.12 |
| 3,242,185 | 3/1966 | Shen | 260—294.8 |
| 3,242,192 | 3/1966 | Shen et al. | 260—326.13 |
| 3,271,394 | 9/1966 | Shen | 260—247.2 |
| 3,271,413 | 9/1966 | Shen et al. | 260—310 |
| 3,275,644 | 9/1966 | Shen | 260—302 |
| 3,285,908 | 11/1966 | Shen | 260—211 |
| 3,294,811 | 12/1966 | Shen et al. | 260—302 |
| 3,316,267 | 4/1967 | Shen | 260—250 |

OTHER REFERENCES

Smith, The Chemistry of Open-Chain Organic Nitrogen Compounds, (1966), QD412, N1, S6, pp. 145, 163, 170–71.

ALEX MAZEL, Primary Examiner

J. A. NARCAVAGE, Assistant Examiner

U.S. Cl. X.R.

260—256.4, 294, 295, 295.5, 302, 310, 326.12, 326.14, 332.2, 347.3, 518, 519, 558, 559; 424—274

Disclaimer 3,629,284.—*Hisao Yamamoto*, Nishinomiya-shi, and *Masaru Nakao*, Osaka, Japan. PROCESS FOR THE PREPARATION OF 3-INDOLYL ALIPHATIC ACID DERIVATIVES. Patent dated Dec. 21, 1971. Disclaimer filed Jan. 25, 1971, by the assignee, *Sumitomo Chemical Company, Ltd.*

Hereby disclaims the portion of the term of the patent subsequent to Feb. 16, 1988.

[*Official Gazette September 19, 1972.*]